United States Patent
Gray et al.

(10) Patent No.: US 7,120,554 B2
(45) Date of Patent: Oct. 10, 2006

(54) METHOD OF DETERMINING AND INDICATING AIRBAG SUPPRESSION STATUS

(75) Inventors: Charles A. Gray, Noblesville, IN (US); Royce L. Rennaker, Converse, IN (US); Eric C. Hayden, Cicero, IN (US); Chance L Scales, Kokomo, IN (US); John D. Scott, Commerce Township, MI (US); Brenda S. Cosgrove, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 380 days.

(21) Appl. No.: 10/804,245

(22) Filed: Mar. 18, 2004

(65) Prior Publication Data

US 2005/0205332 A1 Sep. 22, 2005

(51) Int. Cl.
*G01G 9/00* (2006.01)
(52) U.S. Cl. .................................................. 702/173
(58) Field of Classification Search ............... 702/103
See application file for complete search history.

(56) References Cited

U.S. PATENT DOCUMENTS 5,987,370 A  11/1999  Murphy et al.
6,012,007 A *  1/2000  Fortune et al. ............... 701/45
6,490,936 B1  12/2002  Fortune et al.
2002/0043789 A1  4/2002  Lichtinger et al.
2002/0185318 A1*  12/2002  Aoki et al. .................. 177/144
2003/0216886 A1  11/2003  Hattori et al.

FOREIGN PATENT DOCUMENTS

EP  1577170  *  9/2005
WO  WO 01/18506  3/2001

OTHER PUBLICATIONS

European Search Report dated Jun. 22, 2005.
U.S. Appl. No. 10/680,534, filed Oct. 7, 2003, Gray et al.

* cited by examiner

*Primary Examiner*—John Barlow
*Assistant Examiner*—C. D. Khuu
(74) *Attorney, Agent, or Firm*—Jimmy L. Funke

(57) ABSTRACT

An occupant weight-based airbag suppression method utilizes adjustable time constant filtering and dynamic threshold adjustment to reliably determine and indicate airbag suppression status. The filter time constant is ordinarily set to a first value that provides relatively fast tracking of the raw occupant weight, but is set to a second value that provides relatively slow tracking of the raw occupant weight when both the raw and filtered occupant weights are within a specified band about the threshold value. The threshold value and band are dynamically adjusted after the suppression status is initially determined so as to effectively increase the separation between the filtered weight and the threshold.

4 Claims, 5 Drawing Sheets

| MEASURED WEIGHT | SEAT STATUS | PAD LAMP STATUS |
|---|---|---|
| MEAS_WT <= THR_OCC | EMPTY | OFF |
| MEAS_WT > THR_OCC MEAS_WT < THR_ALLOW | OCCUPIED_SUPPRESS | ON |
| MEAS_WT >= THR_ALLOW | OCCUPIED_ALLOW | OFF |

METHOD OF DETERMINING AND INDICATING AIRBAG SUPPRESSION STATUS

TECHNICAL FIELD

This invention relates to airbag deployment suppression in a motor vehicle based on detected occupant weight, and more particularly to a method of determining and indicating the airbag suppression status.

BACKGROUND OF THE INVENTION

Vehicle occupant seated weight detection systems are useful in connection with air bags and other pyrotechnically deployed restraints as a means of characterizing the occupant and determining if airbag deployment should be disabled. In particular, the seated weight of the occupant may be used to distinguish between large and small occupants, and between a small occupant and an empty seat. For example, a large occupant is deemed to be present if the measured seated weight (MEAS_WT) is above an "allow" threshold (THR_ALLOW) corresponding to a minimum large occupant seated weight such as 60 lbs; a small occupant is deemed to be present if MEAS_WT is between THR_ALLOW and an "occupied" threshold (THR_OCC) corresponding to a minimum small occupant seated weight such as 12 lbs; and the seat is deemed to be empty if MEAS_WT is less than THR_OCC. Typically, airbag deployment is suppressed in the case of an empty seat or a small occupant, and not suppressed in the case of a large occupant, although in some cases reduced force deployment is allowed for a small occupant.

In most systems, the status of airbag suppression is visually conveyed to the occupants by means of an instrument panel lamp, referred to herein as a Passenger Airbag Disabled (PAD) lamp. A typical requirement is that the PAD lamp should be unlit when the seat is empty, lit when the seat is occupied by a small occupant, and unlit when the seat is occupied by a large occupant, as depicted by the table of FIG. 1. Of course, various other strategies are also possible; for example, the PAD lamp can have a separate state for indicating that the seat is empty, reduced force deployment can be enabled for a small occupant as mentioned above, and so on. In any event, the measured weight of an occupant (or an inanimate object for that matter) tends to vary somewhat due to occupant weight shifting and vehicle movement, resulting in oscillation of the suppression status, particularly if MEAS_WT is close to THR_OCC or THR_ALLOW. Such oscillation is undesired of course, and the accompanying oscillation or toggling of the PAD lamp tends to annoy the occupants and undermine their confidence in the suppression system. While hysteresis can be employed to prevent repeated changes in the occupant status due to minor oscillation of the measured weight, experience has shown that hysteresis alone is inadequate. Accordingly, what is needed is a more robust method of determining and indicating the suppression status of a weight-based airbag suppression system.

SUMMARY OF THE INVENTION

The present invention is directed to an improved method of determining and indicating airbag suppression status in an occupant weight-based airbag suppression system. The suppression status is determined by low-pass filtering the measured or raw occupant weight with an adjustable time constant filter and comparing the filtered weight to one or more threshold values. The filter time constant is ordinarily set to a first value that provides relatively fast tracking of the raw occupant weight, but is set to a second value that provides relatively slow tracking of the raw occupant weight when both the raw and filtered occupant weights are within a specified band about the threshold value. In a preferred implementation, the threshold value and band are dynamically adjusted after the suppression status is initially determined so as to effectively increase the separation between the filtered weight and the threshold.

BRIEF DESCRIPTION OF THE DRAWINGS

FIG. 4A depicts positive adjustment of the weight threshold and band, while FIG. 4B depicts negative adjustment.

FIG. 5 depicts a routine for filter time constant adjustment, while FIG. 6 depicts a routine for weight threshold and threshold band adjustment.

DESCRIPTION OF THE PREFERRED EMBODIMENT

The present invention is disclosed in the context of a restraint system for an occupant of a vehicle passenger seat, where the occupant seated weight is detected based on the fluid pressure in a seat cushion bladder. In general, however, the present invention applies to other types of weight-based occupant detection systems as well, such as systems that sense the strain in a seat frame element, or systems that include a network of pressure sensitive cells distributed over the seating area.

Figures 1, 2:
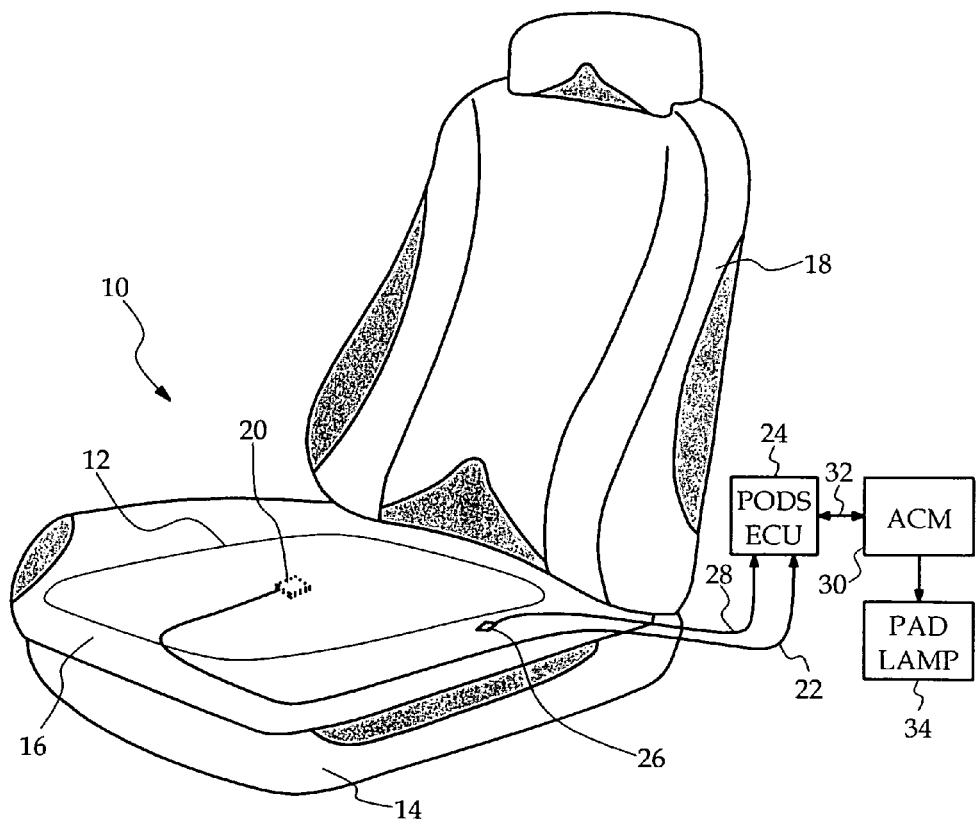
FIG. 1 is a table depicting a suppression status determination and indication strategy.
FIG. 2 is a system diagram illustrating a passenger seat of a vehicle equipped with a fluid-filled bladder, a passive occupant detection system electronic control unit (PODS ECU), an airbag control module (ACM) and a passenger airbag suppressed (PAD) lamp according to this invention.

Referring to FIG. 2, the vehicle seat 10 is supported on a frame 14, and includes foam cushions 16 and 18 on the seat bottom and back. The bladder 12 is disposed in or under the foam cushion 16 substantially parallel with the central seating surface, and preferably contains a fluid such as silicone which is non-corrosive, and not subject to freezing at extreme ambient temperatures. In addition, semi-rigid interface panels may be placed above and/or beneath the bladder 12 to protect the bladder from puncture damage and to provide a suitable reaction surface, as disclosed for example in the U.S. Pat. No. 6,490,936, assigned to the assignee of the present invention, and incorporated herein by reference. A pressure sensor 20 is responsive to the fluid pressure in bladder 12, and provides a pressure signal on line 22 to a passive occupant detection system electronic control unit (PODS ECU) 24. A seat temperature sensor 26 (which may be located in the seat cushion 16, as shown, or in the POS ECU 24) provides a temperature signal to PODS ECU 24 on line 28. The PODS ECU 24 characterizes the seat occupancy based on the pressure and temperature signals, and provides a characterization signal to airbag control module (ACM) 30 via line 32. The ACM 30 may be conventional in nature, and operates to deploy one or more airbags or other restraint devices (not shown) for vehicle occupant protection based on measured vehicle acceleration and suppression status data obtained from PODS ECU 24. The airbag suppression status is communicated to the vehicle occupants by way of an instrument panel indicator lamp 34. The lamp 34, referred to herein as the Passenger Airbag Disabled (PAD) lamp, is turned on or off according to the table of FIG. 1 as described above.

The primary function of PODS ECU 24 is to determine the measured occupant weight MEAS_WT based on the pressure and temperature signals provided by sensors 20 and 26, as described for example in the U.S. Pat. No. 5,987,370 to Murphy et al. (which is incorporated by reference herein), and to characterize the occupant of seat 10 for purposed of determining whether airbag deployment should be allowed or suppressed. Referring to FIG. 1, MEAS_WT is compared to an occupied threshold THR_OCC and an allow threshold THR_ALLOW. The seat is deemed to be empty (SEAT STATUS=EMPTY) if MEAS_WT is less than or equal to THR_OCC, occupied by a small occupant (SEAT STATUS=OCCUPIED_SUPPRESS) if MEAS_WT is between THR_OCC and THR_ALLOW, and occupied by a large adult (SEAT STATUS=OCCUPIED_ALLOW) if MEAS_WT is at or above THR_ALLOW. The PAD lamp 34 is OFF if SEAT STATUS=EMPTY, ON if SEAT STATUS=OCCUPIED_SUPPRESS, and OFF if SEAT STATUS=OCCUPIED_ALLOW.

As a practical matter, MEAS_WT, referred to hereinafter as the raw weight RAW_WT, is usually low-pass filtered to attenuate transients, and the filtered version of RAW_WT, referred to hereinafter as FILT_WT, is the signal that is compared to the thresholds THR_OCC and THR_ALLOW to determine the airbag suppression status. For example, FILT_WT may be periodically calculated according to the expression:

$$FILT\_WT = FILT\_WT\_OLD + [(RAW\_WT - FILT\_WT\_OLD) * FILT\_TC]$$

where FILT_WT_OLD is the previous (or just initialized) value of FILT_WT, and FILT_TC is the filter time constant.

Figure 3:
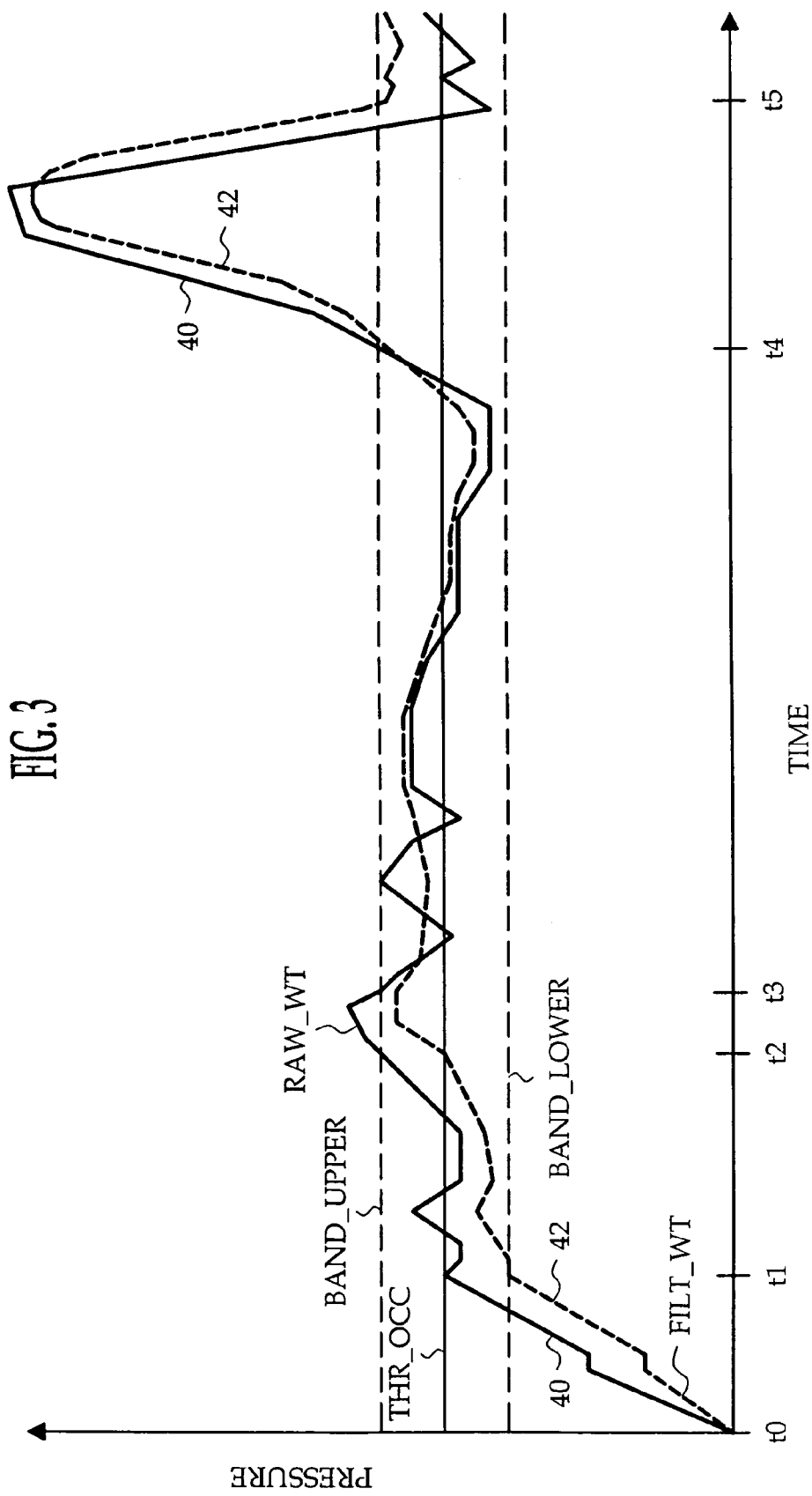
FIG. 3 graphically depicts adjustment of a filter time constant according to this invention.

According to this invention, the filter time constant FILT_TC is adjustable, and optionally, one or both of the thresholds THR_OCC and THR_ALLOW are dynamically adjusted after the occupant status is initially determined so as to effectively increase the separation between FILT_WT and the respective threshold. FIG. 3 graphically depicts an adjustment of FILT_TC, while FIGS. 4A–4B graphically depict an adjustment of THR_OCC and a threshold window or band about THR_OCC. Each of these figures depict the threshold THR_OCC, the limits BAND_UPPER, BAND_LOWER of the threshold band and the filtered occupant weight FILT_WT in terms of pressure as a function of time.

Referring to FIG. 3, the raw weight RAW_WT is depicted by the solid trace 40, and the filtered weight FILT_WT is depicted by the broken trace 42. In the time interval t0–t1, an object is placed on the seat cushion 16 during vehicle operation, and in the time interval t4–t5, the measured weight is temporarily increased for some reason. In the time intervals t0–t1, t2–t3 and t4–t5, at least one of RAW_WT and FILT_WT is outside the threshold band, and FILT_WT is computed using a first calibrated time constant, referred to herein as CAL_FAST, that provides relatively fast tracking of RAW_WT. In the time intervals t1–t2, t3–t4 and following t5, however, both RAW_WT and FILT_WT are inside the threshold band, and FILT_WT is computed using a second calibrated time constant, referred to herein as CAL_SLOW, that provides relatively slow tracking of RAW_WT. The result is that FILT_WT closely tracks RAW_WT whenever RAW_WT is outside the threshold band or is changing significantly, but tends to remain relatively constant when RAW_WT remains within the threshold band. This significantly reduces oscillation or toggling of the seat status due to vehicle movement related variations in RAW_WT, particularly when there is a package or other object resting on the seat cushion 16. For example, RAW_WT momentarily falls below THR_OCC shortly after time t3, while FILT_WT remains above THR_OCC, eliminating unwarranted and undesired changes in the seat status. However, when RAW_WT experiences an abrupt change at time t4, the filter time constant is changed from CAL_SLOW to CAL_FAST, and FILT_WT closely tracks RAW_WT, resulting in a seat status change that is appropriate.

Figure 4A:
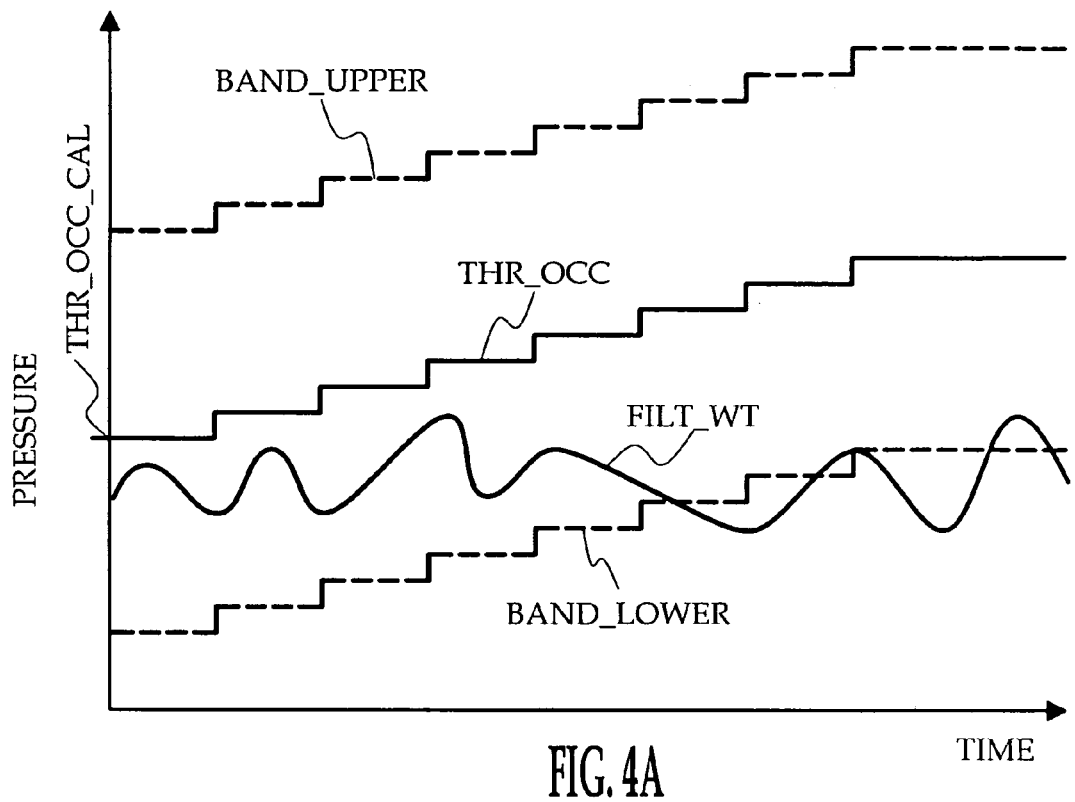
FIGS. 4A and 4B graphically depict adjustment of a weight threshold and threshold band according to this invention.
Figure 4B:
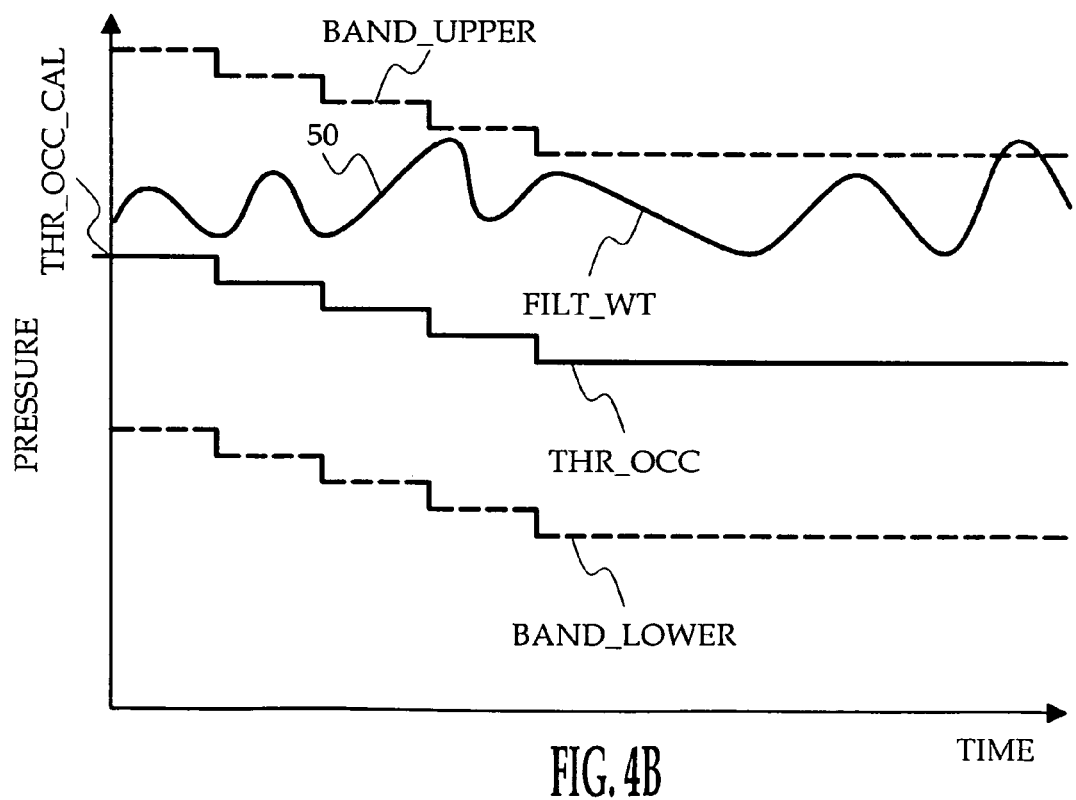

In the illustration of FIGS. 4A and 4B, the threshold THR_OCC is initialized at a calibrated value THR_OCC_CAL, but is subject to dynamic adjustment if FILT_WT consistently remains below or above THR_OCC. In each case, the adjustment widens the existing separation between FILT_WT and THR_OCC to prevent undesired and erroneous oscillation between the EMPTY and OCCUPIED_SUPPRESS occupant states, and the associated toggling of the PAD lamp 34. As shown in FIGS. 4A and 4B, the calibrated separation of the upper and lower limits BAND_UPPER, BAND_LOWER from THR_OCC is maintained when THR_OCC is dynamically adjusted according to this invention. It will be understood that the same method may be applied to the allow threshold THR_ALLOW if desired.

In the illustration of FIG. 4A, FILT_WT consistently remains below THR_OCC, as might occur when a package or other inanimate object is lying on the seat cushion 16 during operation of the vehicle. The undulation may the result of shifting of the package due to vehicle movement, and/or objects being added to or removed from the seat cushion 16 during vehicle operation. In any event, the seat status is initially characterized as EMPTY, and the PAD light 34 is turned off. Once FILT_WT remains below THR_OCC for at least a reference time, the PODS_ECU 24 dynamically increases THR_OCC in step-wise fashion as shown. Increasing THR_OCC in this way effectively increases the separation between FILT_WT and THR_OCC, reducing the likelihood that FILT_WT will reach THR_OCC unless there is a major change in the seat occupancy. As a result, the PAD lamp 34 remains off, preventing occupant annoyance due to unexpected and unwarranted oscillation or toggling of PAD lamp 34. If and when FILT_WT subsequently exceeds THR_OCC, the seat status is changed to OCCUPIED_SUPPRESS and the threshold THR_OCC and band limits are reset to their calibrated values. The reference time and the amount by which THR_OCC may be increased above THR_OCC_CAL in this manner are specified by the calibration engineer.

In the illustration of FIG. 4B, FILT_WT consistently remains above THR_OCC, as might occur when seat 10 is occupied by a small occupant. The undulation in this case may be the result of occupant shifting and/or vehicle movement. In any event, the occupant status is initially characterized as OCCUPIED_SUPPRESS, and the PAD light 34 is turned on. Once FILT_WT remains above THR_OCC for at least a reference time, the PODS_ECU 24 dynamically decreases THR_OCC in step-wise fashion as shown.

Decreasing THR_OCC in this way effectively increases the separation between FILT_WT and THR_OCC, reducing the likelihood that FILT_WT will reach THR_OCC unless there is a major change in the seat occupancy. As a result, the PAD lamp 34 remains on, preventing occupant annoyance due to unexpected and unwarranted oscillation or toggling of the lamp 34. If and when FILT_WT subsequently falls below THR_OCC, the seat status is changed to EMPTY and the thresholds THR_OCC, BAND_UPPER and BAND_LOWER are reset to their calibrated values. As in the example of FIG. 4A, the reference time and the amount by which THR_OCC may be decreased below THR_OCC_CAL are specified by the calibration engineer; for example, it will be noted in the illustrations that the threshold adjustment limit can be calibrated to a lower value in the case of FIG. 4B where SEAT STATUS=OCCUPIED_SUPPRESS than the case of FIG. 4A where SEAT STATUS=EMPTY.

Figure 5:
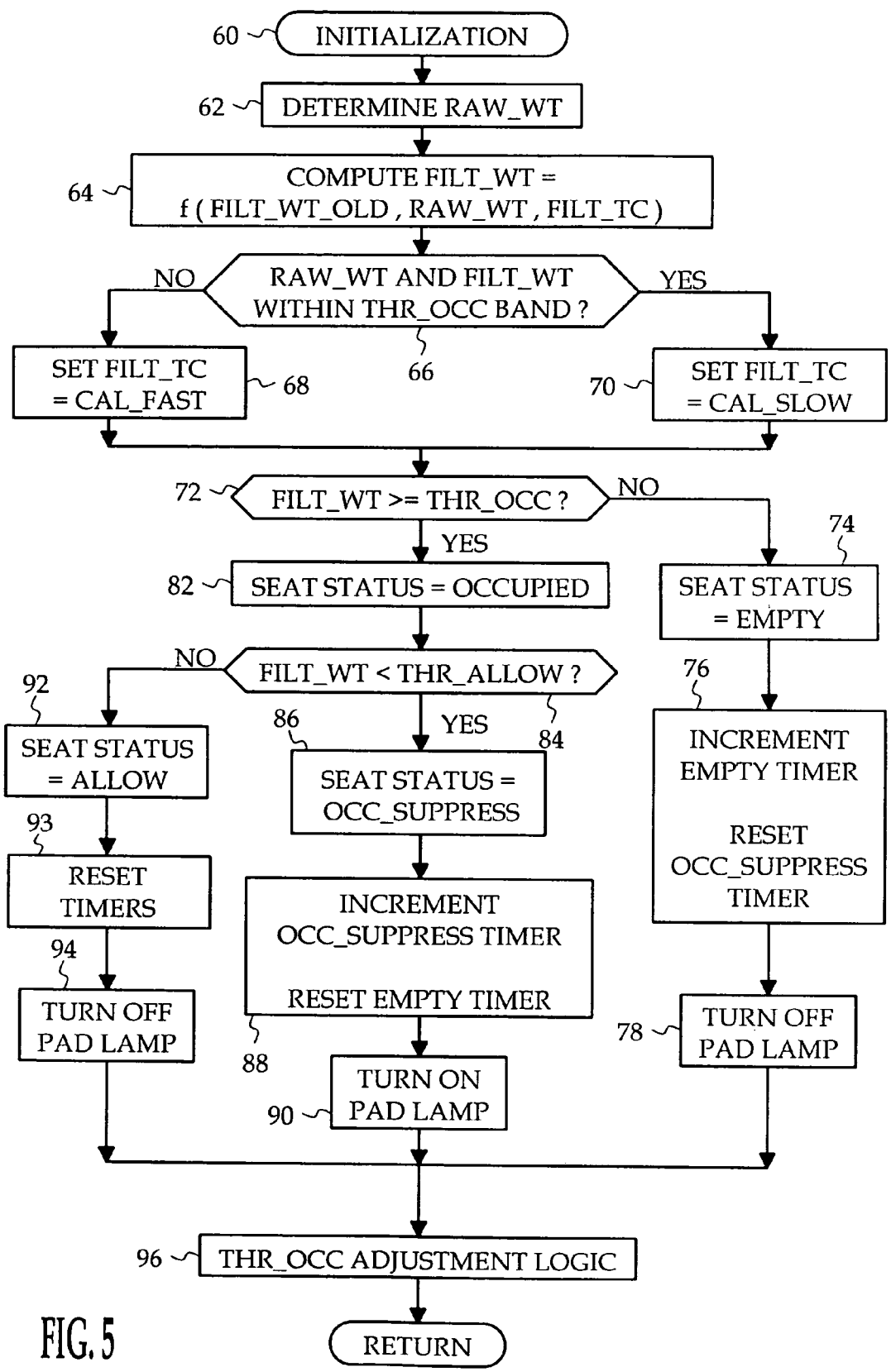
FIGS. 5–6 depict flow diagrams representative of software routines executed by the PODS ECU of FIG. 2 in carrying out the method of this invention.
Figure 6:
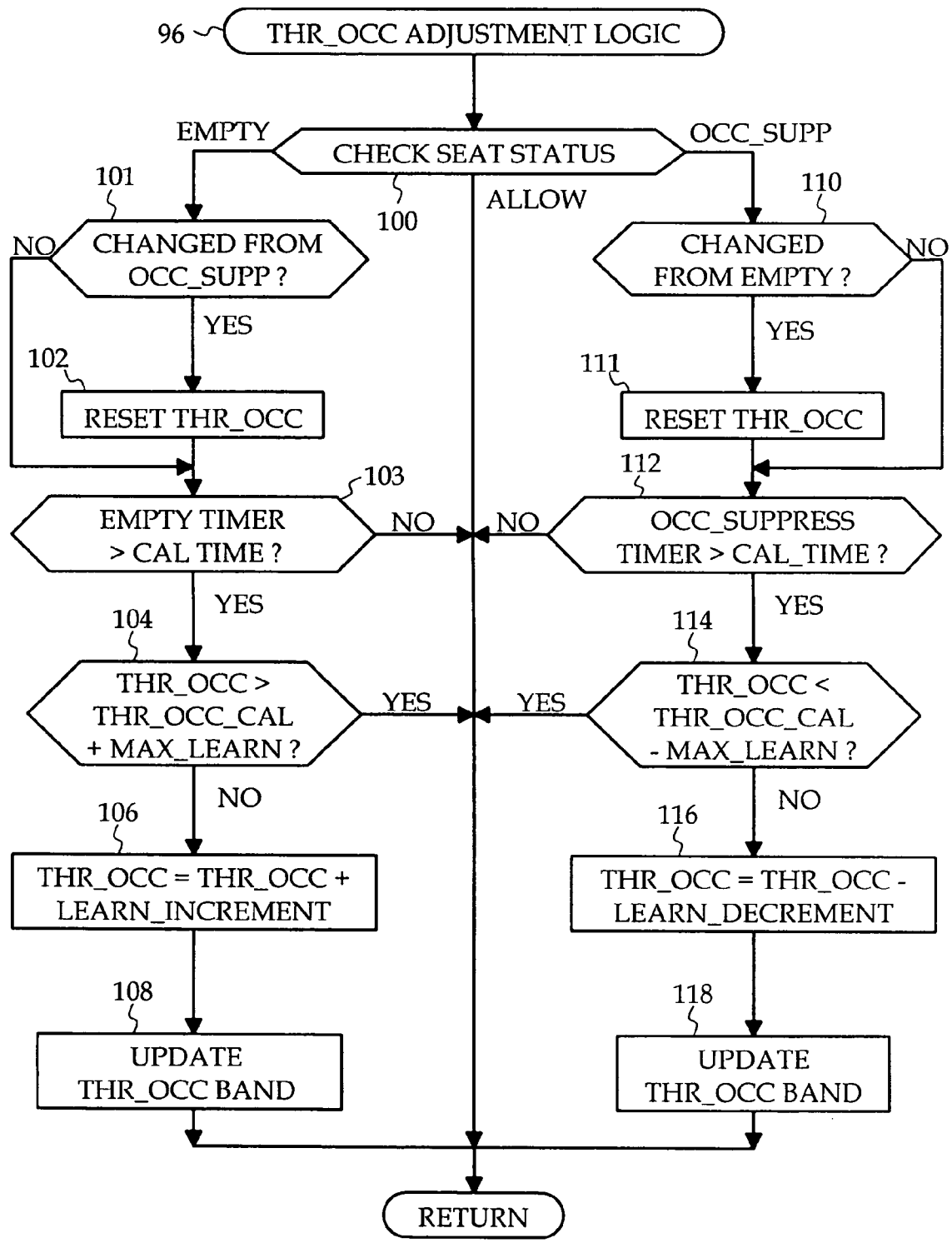

The flow diagrams of FIGS. 5–6 illustrate a software routine periodically executed by the PODS ECU 24 for carrying out the above-described method. The flow diagram of FIG. 5 depicts a routine for adjustment of the filter time constant FILT_TC, whereas the flow diagram of FIG. 6 depicts a routine for dynamic adjustment of occupied threshold THR_OCC.

Referring to FIG. 5, the block 60 designates a series of initialization instructions executed at engine key-on for resetting various flags and variables; for example, the filter time constant FILT_TC is set to a first calibrated value CAL_FAST that provides relatively fast tracking of the raw occupant weight. The raw occupant weight RAW_WT is determined at block 62 based on the pressure and temperature signals on lines 22 and 28 of FIG. 1, and may be given either as a pressure or a corresponding weight. The block 64 then computes the filtered version FILT_WT of RAW_WT using the above-mentioned first-order low-pass filter equation. Of course, different low-pass filter functions may be used if desired.

Following calculation of FILT_WT, the block 66 is executed to determine if both RAW_WT and FILT_WT are within a predefined band or window about the occupied threshold THR_OCC. The band, also referred to herein as the threshold band, is defined by upper and lower limits BAND_UPPER, BAND_LOWER that vary with THR_OCC as graphically depicted in FIGS. 3 and 4A–4B. Ordinarily, both RAW_WT and FILT_WT are not within the band, and the block 68 sets FILT_TC to the initialization value CAL_FAST. If both RAW_WT and FILT_WT are within the band, the block 70 sets FILT_TC to a second calibrated time constant CAL_SLOW that provides relatively slow tracking of the RAW_WT.

If FILT_WT is less than THR_OCC, as determined at block 72, the blocks 74, 76 and 78 are executed to set SEAT STATUS to EMPTY, to increment an EMPTY TIMER, to reset an OCC_SUPPRESS TIMER, and to turn off the PAD lamp 34. Otherwise, SEAT STATUS is set to OCCUPIED at block 82, and the block 84 compares FILT_THR to the allow threshold THR_ALLOW to determine if the occupant is large or small. If FILT_WT is less than THR_ALLOW, the blocks 86, 88 and 90 are executed to set SEAT STATUS to OCC_SUPPRESS, to increment the OCC_SUPPRESS TIMER, to reset the EMPTY TIMER, and to turn on the PAD lamp 34. If FILT_WT is greater than or equal to THR_ALLOW, the blocks 92, 93 and 94 are executed to set SEAT STATUS to ALLOW, to reset the EMPTY and OCC_SUPPRESS TIMERS, and to turn off the PAD lamp 34. In each case, the routine is completed by executing block 96 to determine if the occupied threshold THR_OCC should be adjusted according to this invention.

The THR_OCC adjustment logic (that is, block 96 of FIG. 5) is detailed by the flow diagram of FIG. 6. Referring to FIG. 6, the block 100 is first executed to check the seat status.

If SEAT STATUS is EMPTY, the block 101 determines if the seat status has just changed to EMPTY from OCCUPIED_SUPPRESS. If so, the block 102 resets the occupied threshold THR_OCC and the threshold band limits BAND_UPPER and BAND_LOWER to their initialization (calibration) values. Then the block 103 compares the EMPTY TIMER value to a reference time CAL_TIME such as fifteen seconds. If EMPTY TIMER exceeds CAL_TIME, blocks 104, 106 and 108 increase THR_OCC by a learning increment LEARN_INCREMENT such as two lbs., provided that THR_OCC is not already above its calibrated value THR_OCC_CAL by more than a maximum leaning amount MAX_LEARN, and update the threshold band limits BAND_UPPER, BAND_LOWER accordingly.

If SEAT STATUS is OCC_SUPPRESS, the block 110 determines if the seat status has just changed to OCCUPIED_SUPPRESS from EMPTY. If so, the block 111 resets the occupied threshold THR_OCC and the threshold band limits BAND_UPPER and BAND_LOWER to their initialization (calibration) values. Then the block 112 compares the OCC_SUPPRESS TIMER value to a reference time CAL_TIME such as fifteen seconds. If the timer exceeds CAL_TIME, blocks 114, 116 and 118 decrease THR_OCC by a learning decrement LEARN_DECREMENT such as two lbs., provided that THR_OCC is not already below its calibrated value THR_OCC_CAL by more than the maximum leaning amount MAX_LEARN, and update the threshold band limits BAND_UPPER, BAND_LOWER accordingly.

In summary, the method of the present invention provides a robust way of determining and indicating the suppression status of a weight-based airbag suppression system. The adjustable time constant filtering and dynamic threshold adjustment cooperate to substantially eliminate annoying and undesired oscillation or toggling of the passenger seat status and the corresponding airbag suppression status indication, without hampering the ability of the system to respond to true changes in the passenger occupant status. While described in reference to the illustrated embodiment, it is expected that various modifications will occur to persons skilled in the art. For example, this invention is not limited to pressure based bladder systems, and may be applied equally as well to other occupant detection systems, as indicated above. Also, the adjustable time constant filtering may be used either with or without the dynamic threshold adjustment, the method of the invention can be applied to thresholds other than the occupied threshold, and so on. Accordingly, it should be understood that occupant characterization methods incorporating these and other modifications may fall within the scope of this invention, which is defined by the appended claims.

The invention claimed is:

1. A method of indicating occupancy status of a vehicle seat based on a measure of seated weight, comprising the steps of:

applying the measure of seated weight to a low-pass filter function having an adjustable time constant to form a filtered weight;

establishing a weight threshold and a band about said weight threshold;

setting said adjustable time constant to a first value that provides relatively fast tracking of the measure of seated weight by the filtered weight when at least one of the measure of seated weight and the filtered weight are outside said band;

setting said adjustable time constant to a second value that is lower than said first value to provide relatively slow tracking of the measure of seated weight by the filtered weight when the measure of seated weight and the filtered weight are both within said band; and determining and indicating occupancy status of said seat based on a comparison of said filtered weight with said weight threshold.

2. The method of claim 1, including the steps of:

initializing said weight threshold at a calibrated value;

detecting a condition for which the measure of seated weight is consistently above the weight threshold or consistently below the weight threshold for at least a predefined time interval; and adjusting the weight threshold in response to the detected condition so as to increase a separation between the weight threshold and the measure of seated weight.

3. The method of claim 2, including the step of:

interrupting the adjustment of the weight threshold when a difference between the weight threshold and said calibrated value reaches a maximum adjustment value.

4. The method of claim 2, wherein said band is defined by upper and lower limit values that track changes in said weight threshold.

* * * * *